July 17, 1923.
L. C. McDERMOTT
FLYCATCHER
Filed Sept. 3, 1921
1,462,416
2 Sheets-Sheet 2
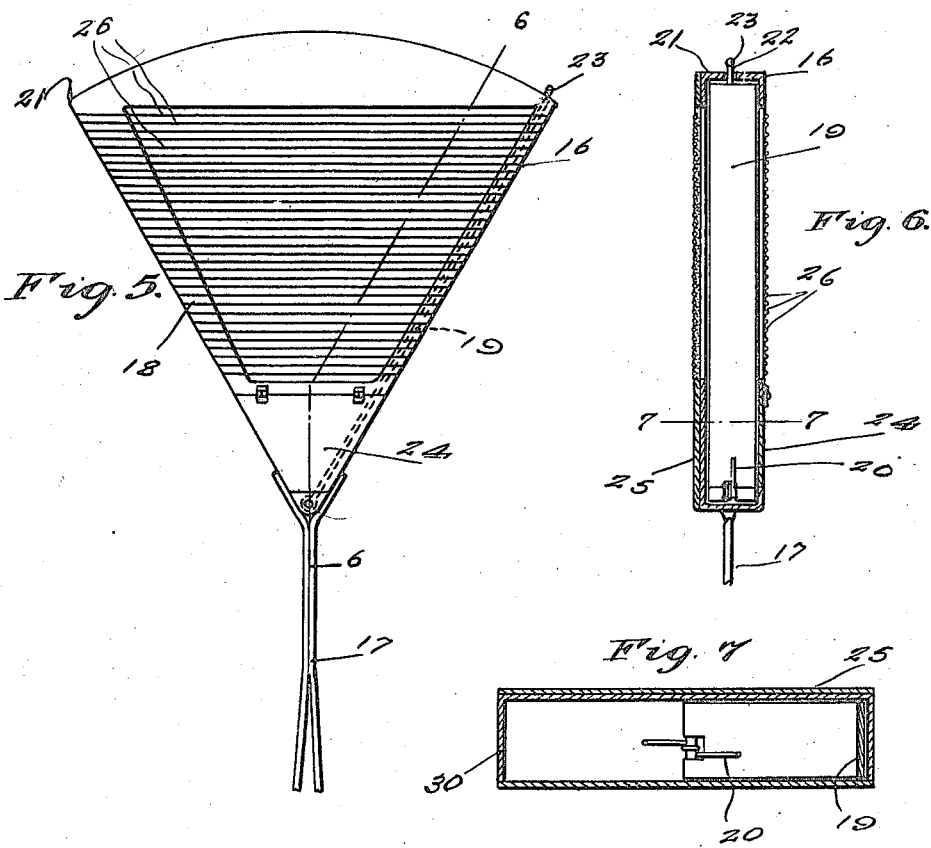
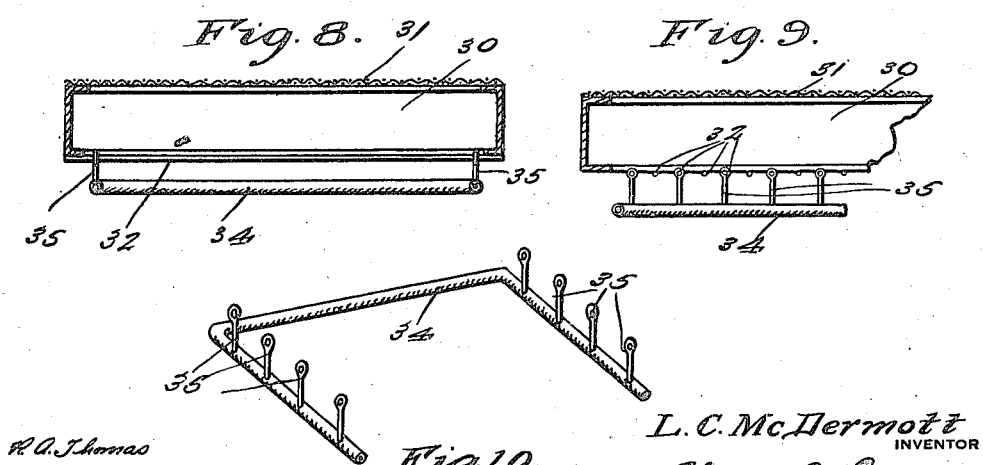
L. C. McDermott
INVENTOR
BY Victor J. Evans
ATTORNEY
WITNESSES Patented July 17, 1923.

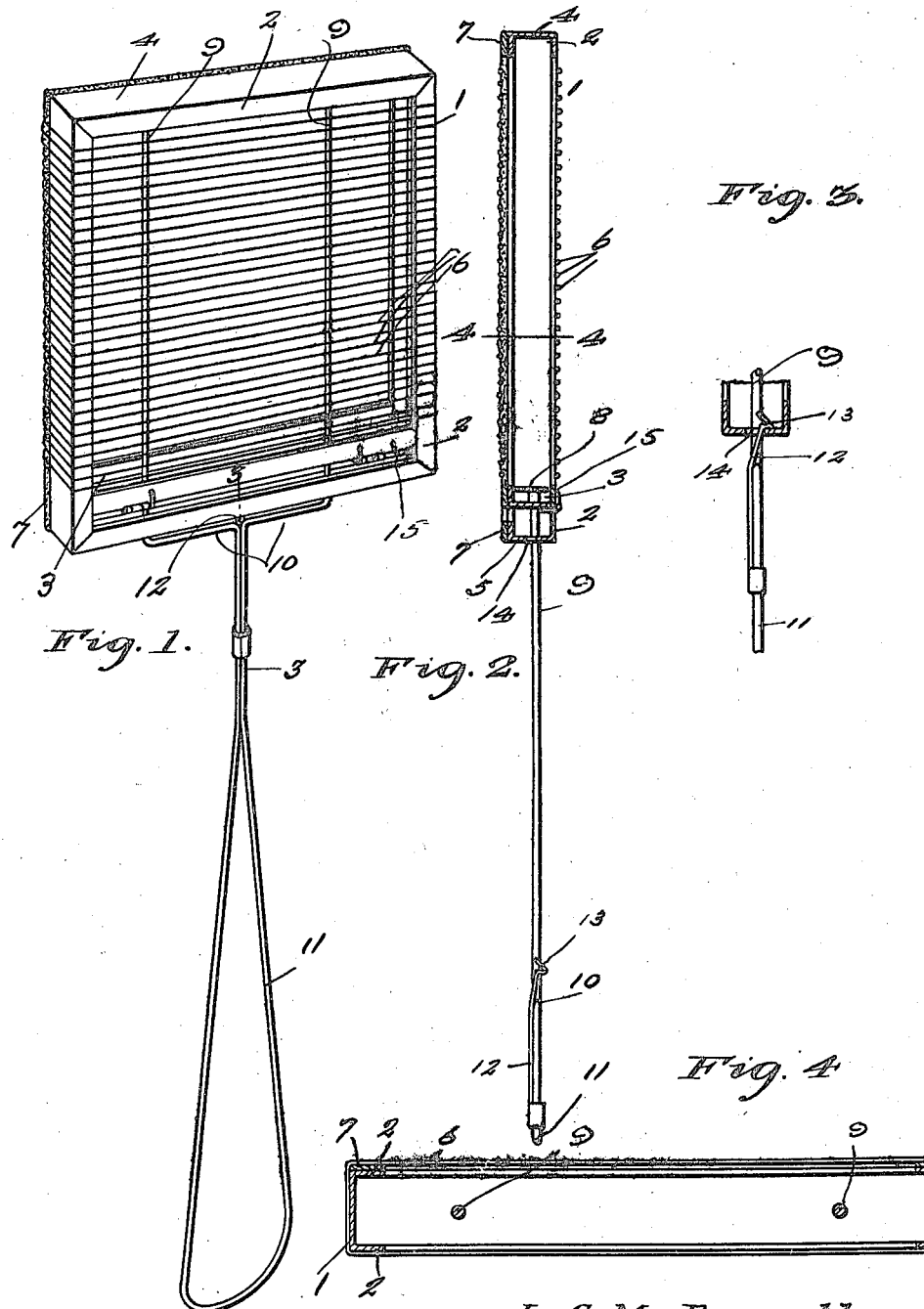

1,462,416

UNITED STATES PATENT OFFICE.

LYLE CHAS. McDERMOTT, OF POCATELLO, IDAHO.

FLYCATCHER.

Application filed September 3, 1921. Serial No. 498,233.

*To all whom it may concern:*

Be it known that I, LYLE C. McDERMOTT, a citizen of the United States, residing at Pocatello, in the county of Bannock and State of Idaho, have invented new and useful Improvements in Flycatchers, of which the following is a specification.

My present invention has reference to a means for trapping and exterminating flies in a sanitary manner.

My object is to produce a fly catcher which has the appearance of an ordinary fly swatter, but which is in the nature of an open frame having on its sides closely spaced elastic strips and its edges provided with a facing of compressible material whereby, when the device is forced against an article on which a fly to be trapped rests, it will not inflict injury to said article, and also whereby the fly over which the device is arranged will by his struggle to escape cause a yielding of the elastic strips which enter the trap provided by the frame and as a matter of fact because of the pressure exerted against the fly by the elastic strips the fly will be forced into the trap. After a number of flies have been thus entrapped, the same are moved bodily toward a drawer or receptacle in the frame by a slide provided for this purpose, the said slide acting on the flies in a manner to kill but not mash the same, and the receptacle being provided with a door whereby the exterminated flies may be removed from the receptacle.

It is a still further object to produce a sanitary fly exterminator that shall be of a comparatively simple construction, cheaply manufactured and marketed, and thoroughly efficient for the purpose for which it is devised.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a perspective view of a fly catcher made in accordance with this invention.

Figure 2 is an approximately central vertical longitudinal sectional view through the same and showing the slide moved to force the trapped flies into the compartment where they are exterminated.

Figure 3 is a fragmentary sectional view approximately on the line 3—3 of Figure 1.

Figure 4 is a transverse sectional view approximately on the line 4—4 of Figure 2.

Figure 5 is a side elevation of a slight modification.

Figure 6 is a sectional view on the line 6—6 of Figure 5.

Figure 7 is a sectional view on the line 7—7 of Figure 6.

Figure 8 is a longitudinal sectional view through a still further modification.

Figure 9 is a sectional view taken transversely through the construction illustrated in Figure 8.

Figure 10 is a fragmentary perspective view of the auxiliary frame employed in Figures 8 and 9.

In the illustrative embodiment of the improvement disclosed in Figures 1 to 4 inclusive, it will be seen that I make use of a body member which is in the nature of a substantially rectangular frame 1. The frame, while susceptible to construction from any desired material is preferably formed of metal and has all of its edges inturned to provide flanges 2. The frame, adjacent to the bottom thereof is provided with a transversely arranged compartment 3, the same being in the nature of a member which is substantially U-shaped in cross section and which is open toward the top of the frame 1. For distinction, the top of the frame 1 is indicated by the numeral 4 and the bottom by the numeral 5.

Arranged transversely in parallel and in close relation to each other over the faces of the frame 1 are yieldable strips 6 which are preferably in the nature of elastic members. These strips form bars for the cage which is provided by the frame 1, and the distance between the elastic bars is such as to permit of the entrance of a fly therebetween when either of the faces of the frame have been brought against the insect, and the said bars are caused to yield by such contact so that the fly will enter the cage or trap without inflicting injury to the insect. Also, it is to be understood, the bars are so spaced, that the insect cannot find egress from the trap therebetween. The edges of the frame which provides the cage or trap have a compressible facing 7 thereon, and if desired, the sides or ends of the cage or trap may be provided with a similar facing.

In the cage or trap, between the flanges 2 thereof, there is a plate 8 which is in the nature of a slide. This plate has secured thereto spaced bars 9 that pass through suitable openings in the bottom of the trough-like receptacle 3 and in the bottom 5 of the cage or trap. The bars 9 have their ends, which pass through the bottom 5 directed toward each other, as at 10 and may be from thence extended angularly in parallelism or may be connected to a handle member 11. On the handle member, at the end thereof adjacent to the cage or trap there is a projecting spring 12 that has its outer end bent upon itself to provide a hook 13. The hook is designed to be received through the opening 14 in the bottom 5 of the cage or trap, and by virtue of the resiliency of the spring to spring against the inner face of the said wall 5, and thus hold the slide 8 between the flanges of the upper or outer member 4 of the cage or trap. The spring portions 10 of the rods 9 are disposed a slight but suitable distance away from the bottom 5 of the cage or trap so that the finger of the operator may pass therebetween to contact with the spring 12 to bring the hook 13 thereof in a line with the opening 14 to permit of the passage of the catch provided by the said hook therethrough, and the handle 11 may be drawn away from the frame, causing the slide 8 to be moved downwardly into the trough or receptacle 3 for exterminating the trapped flies. The numeral 15 designates a normally closed door which communicates with the trough-like receptacle 3, and whereby the exterminated insects may find an outlet.

In Figure 5, and the remaining figures of the drawings, the construction only slightly differs from that above described. A fan shaped frame 16, is, in this instance, provided and has attached thereto a handle 17. The frame has its edges flanged inwardly and has one of its sides provided with a receptacle 18, similar to the trough-like receptacle 3. The slide 19 is in the nature of a plate which is pivoted to the pointed end of the trap or cage 16 and which is influenced by a spring 20 against the side thereof opposite that provided with the receptacle 18. The slide 19 is in the nature of a plate and the arch-shaped top 21 of the trap or cage has a reduced slot therethrough through which passes the shank 22 of a headed element 23 that is secured to the outer edge of the slide 19. The receptacle is provided with a normally closed outlet door 24 and has its edges, and if desired, its sides provided with a compressible facing 25. Arranged transversely over the opposed faces of the cage or trap are elastic bars 26, similar in construction and arrangement to the bars 7. The spring influenced slide 19, as stated, is normally against the side of the cage or trap opposite that provided with the receptacle 18, and the insects are trapped in a manner as previously described. In neither instance is it necessary to move the slide until a comparatively large number of insects have been trapped, almost sufficient to fill the cage or trap, and it will be apparent that the trapped insects being deprived of food and water and perhaps a necessary amount of air will soon die from these causes and when forced by the slide into the closed receptacle, the live insects will be readily exterminated by only a slight pressure of the slide thereagainst, not sufficient to mash the said flies.

In the remaining figures of the drawings, I have illustrated a further modification. In this instance, a substantially rectangular frame 30 is employed. The frame may have one of its faces covered by a reticulated plate 31 and either the plate 31 or one of the sides of the frame is provided with an outlet door which, of course, is normally latched. The opposite face of the frame 1 has arranged thereon closely related transversely arranged elastic bars 32. The device is provided with a suitable operating handle (not shown).

Over the main frame 31 there is arranged an auxiliary frame 34 which is preferably constructed of wire and which has its sides formed with spaced depending fingers 35, each of said fingers being secured to the alternating elastic bars 32 on the main frame 30. By this arrangement, it will be noted that the auxiliary frame is slightly projected beyond the main frame, and when the same is brought against a surface on which a fly to be caught has alighted, the contact of the auxiliary frame with such surface will move the same inwardly in the main frame, the fingers 35 which engage certain of the elastic bars 32, depressing the latter and spreading the same so that a comparatively wide opening is provided between these bars for the entrance of the flies. The auxiliary frame has a facing of compressible material so that the same will not inflict injury to the surface against which it is brought to contact. In all instances the elastic strips are arranged comparatively close together, that is the distance therebetween is not sufficient to permit of the passage of a fly therethrough. When the device is brought against an article on which a fly to be trapped rests, the insect in his effort to escape will cause the elastic strips to quickly separate, sufficiently to permit of the passage of the insect to the interior of the trap. The tendency of the return of the elastic strips to initial position will give an impetus to the fly upon his entrance to the trap.

In each instance, the frames may have their closed faces covered by reticulated or transparent materials, or if desired the elastic bars may be arranged upon both faces of the frames, and other slight modifications, which fall within the scope of the appended claims may be resorted to.

Having described the invention, I claim:—

1. In a fly catcher, a frame having its sides made up of elastic strips arranged in parallel relation a distance apart less than sufficient to provide the entrance of a fly therebetween, as and for the purpose set forth.

2. In a fly catcher, a frame having its faces provided with elastic strips arranged in parallel relation spaced apart a distance not sufficient to permit of the passage of a fly therebetween, and a handle for the frame, as and for the purpose set forth.

3. In a fly catcher, a frame comprising a trap having inturned edges and having laterally extending parallel elastic strips on the open faces thereof, said strips being spaced a distance apart not sufficient to permit of the passage of a fly therebetween, a compressible facing for the frame, and a handle for the frame all as and for the purpose set forth.

4. A fly catcher comprising a trap in the nature of a frame which has its edges inturned, its faces closed by parallel closely associated elastic bars, a handle for the frame, and a slide in the frame movable from one to the other end thereof.

5. In a fly catcher, a cage or trap comprising an open frame having its faces closed by parallel closely related elastic bars, a receptacle having a normally closed door, in the cage or trap, a slide in the cage or trap movable into the receptacle, and a handle for the cage or trap.

6. A fly catcher comprising a cage having an open face provided with parallel elastic members closely related to prevent the passage of a fly therebetween and designed, when arranged over a fly to be parted by the struggle of the insect to escape and to impede the fly in his entrance to the trap when the bars return to initial position after being parted by the insect.

In testimony whereof I affix my signature.

LYLE CHAS. McDERMOTT.